(12) United States Patent
Bessac et al.

(10) Patent No.: US 11,806,910 B2
(45) Date of Patent: Nov. 7, 2023

(54) PRODUCTION OF A LAYERED SEMI-FINISHED PRODUCT FOR USE IN TIRE PRODUCTION

(71) Applicant: COMPAGNIE GENERALE DES ETABLISSEMENTS MICHELIN, Clermont-Ferrand (FR)

(72) Inventors: Christophe Bessac, Clermont-Ferrand (FR); Franck Daumas, Clermont-Ferrand (FR); Matthieu Lutz, Clermont-Ferrand (FR); Alexandre Laval, Clermond-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 468 days.

(21) Appl. No.: 16/755,929

(22) PCT Filed: Oct. 1, 2018

(86) PCT No.: PCT/EP2018/076632
§ 371 (c)(1),
(2) Date: Apr. 14, 2020

(87) PCT Pub. No.: WO2019/076618
PCT Pub. Date: Apr. 25, 2019

(65) Prior Publication Data
US 2021/0206043 A1    Jul. 8, 2021

(30) Foreign Application Priority Data

Oct. 16, 2017   (FR) ...................................... 1759680

(51) Int. Cl.
*B29C 48/00*    (2019.01)
*B29C 48/35*    (2019.01)
(Continued)

(52) U.S. Cl.
CPC .......... *B29C 48/0021* (2019.02); *B29C 48/35* (2019.02); *B29C 48/635* (2019.02); *B29D 30/0681* (2013.01); *B29C 2948/92152* (2019.02)

(58) Field of Classification Search
CPC ... B29C 48/0021; B29C 48/35; B29C 48/635; B29C 2948/92152; B29C 48/30;
(Continued)

(56) References Cited

U.S. PATENT DOCUMENTS 1,957,518 A    5/1934   Woock
2,163,289 A    6/1939   Pennel et al.
(Continued)

FOREIGN PATENT DOCUMENTS

EP    2792504 A1    10/2014
FR    3001654 A1    8/2014
(Continued)

OTHER PUBLICATIONS

International Search Report dated Dec. 4, 2018, in corresponding PCT/EP2018/076632 (3 pages).

*Primary Examiner* — Jacob T Minskey
*Assistant Examiner* — Caroline Beha
(74) *Attorney, Agent, or Firm* — VENABLE LLP

(57) ABSTRACT

The invention is directed to a production installation (100) that realizes production of a semi-finished product (50) having at least one unvulcanized elastomeric layer (50*a*) and a cover layer (50*b*) assembled therewith. The invention is also directed to a method for producing a semi-finished product (50) for use in tire production.

10 Claims, 2 Drawing Sheets

(51) Int. Cl.
*B29C 48/635* (2019.01)
*B29D 30/06* (2006.01)

(58) Field of Classification Search
CPC ............ B29D 30/0681; B32B 2317/22; B32B 2319/00; B32B 37/153
See application file for complete search history.

(56) References Cited

U.S. PATENT DOCUMENTS

| | | | | |
|---|---|---|---|---|
| 3,366,992 | A | * | 2/1968 | Seanor .................... B29C 43/24 |
| | | | | 425/363 |
| 3,481,818 | A | * | 12/1969 | Wellen .................... B32B 27/00 |
| | | | | 428/318.6 |
| 4,576,563 | A | * | 3/1986 | Harada ................... B29C 48/08 |
| | | | | 425/382.3 |
| 5,171,502 | A | * | 12/1992 | Iseki ..................... B29C 70/504 |
| | | | | 425/114 |
| 5,945,131 | A | * | 8/1999 | Harvey .............. A44B 18/0061 |
| | | | | 425/149 |
| 10,259,147 | B2 | | 4/2019 | Monnereau et al. |
| 2003/0003282 | A1 | * | 1/2003 | Roys ....................... B32B 38/14 |
| | | | | 428/323 |
| 2007/0122605 | A1 | * | 5/2007 | Downing ................ B29C 43/28 |
| | | | | 156/178 |
| 2010/0058851 | A1 | * | 3/2010 | Lawrence ................ G01L 5/282 |
| | | | | 73/123 |
| 2013/0025774 | A1 | * | 1/2013 | Neill .................... B32B 37/153 |
| | | | | 156/244.11 |
| 2015/0034223 | A1 | | 2/2015 | Kaneko |
| 2015/0360398 | A1 | | 12/2015 | Monnereau et al. |
| 2016/0001502 | A1 | | 1/2016 | Urabe |
| 2020/0368958 | A1 | * | 11/2020 | Higashi .................. B29B 7/726 |

FOREIGN PATENT DOCUMENTS

| | | |
|---|---|---|
| JP | 2014-73589 A | 4/2014 |
| KR | 2014-0143935 A | 12/2014 |

\* cited by examiner

PRODUCTION OF A LAYERED SEMI-FINISHED PRODUCT FOR USE IN TIRE PRODUCTION

TECHNICAL FIELD

The invention relates generally to tire production and more particularly to the production of semi-finished products that are destined for inclusion in tires.

BACKGROUND

Tires are commonly constructed that include multiple layers and components, among which layers and components may be one or more layered semi-finished products. As used herein, a "semi-finished product" (or, alternatively, a "layered semi-finished product") refers to an assembly of a layer of an unvulcanized elastomeric mixture and a cover layer. The semi-finished product (or "product") has a substantially constant thickness and is supplied as an elongate element having a length superior to its width and thickness. Some semi-finished products are employed as reinforcement layers in combination with green tires to derive desired tire properties. An example of such use is disclosed by Applicant's European patent EP2792504 and shown in FIG. 1 as an exemplary tread 10 having a reinforcement layer 12 that is used in the production of pneumatic tires that sustain performance on snow and performance on ice.

Problems persist in the creation of layered semi-finished products that are destined for inclusion in one or more tire products (including, but not limited to, inner liners, sidewalls, carcasses and treads). While the elastomeric layer and the cover layer must be sufficiently secured to one another to avoid distortions in either layer, the cover layer must also withstand one or more vulcanization operations so as to retain its intended properties in the end tire product.
A solution is therefore sought for producing a layered semi-finished product so as to assure sufficient alignment and adhesion between an unvulcanized elastomeric layer and a cover layer.

The present invention is directed to a production installation that realizes production of a semi-finished product for use in tire production and having at least one unvulcanized elastomeric layer and a cover layer assembled therewith. The production installation includes an extrusion apparatus that realizes a step of producing the elastomeric layer as a continuous strip having a predetermined thickness and width, with the extrusion apparatus having a rotatable screw and a fixed cylindrical barrel having a generally cylindrical conduit within which the screw is rotatably disposed intermediate a feed inlet that permits introduction of an elastomer mixture into the barrel and a discharge outlet provided with an extrusion nozzle that discharges the elastomer material to a nip formed between a first roller and a second roller that are made to rotate in opposite directions while maintaining a predetermined distance between respective adjacent circumferential extents. The production installation also includes a positioning apparatus that realizes a step of applying the cover layer upon a surface of the elastomeric layer that faces externally of the circumferential extent of the second roller, the positioning apparatus including a storage spool that stores a cover layer material as a roll and an application roller that enables assembly of the cover layer with the elastomeric layer. The production installation further includes a third roller that rotatably cooperates with the second roller to realize a step of transporting the semi-finished product toward a downstream tire production installation with the second roller and the third roller maintaining a predetermined distance between respective adjacent circumferential extents, and the third roller rotating in the same direction as the first roller.

In some embodiments, the axis of rotation of the first roller is offset from the axis of rotation of the second roller; the axes of rotation of the second roller and the third roller are in longitudinal alignment; and the first and third rollers have diameters that are commensurate with one another but different from a larger diameter of the second roller.

In some embodiments, the application roller is disposed at a predetermined distance from the storage spool so as to maintain an angle at which the cover layer realizes sufficient tension prior to its assembly with the elastomeric layer. In some such embodiments, the application roller is linearly actuatable relative to the circumferential extent of the second roller so as to maintain the cover layer along a line of tangential contact with the surface of the elastomeric layer not supported by the circumferential extent of the second roller as the second roller rotates.

In some embodiments, the production installation also includes at least one sensor that realizes a step of detecting the thickness of the elastomeric layer and determining a detected value of the thickness relative to a reference thickness of the elastomeric layer. In some such embodiments, the sensor is disposed intermediate the nip and the application roller.

In some embodiments, the storage spool is in communication with at least 10 one braking device that maintains a consistent rotational speed during unwinding of the cover layer.

The invention is also directed to a method for producing a semi-finished product for use in tire production. The method includes a step of producing an elastomeric layer as a continuous strip having a predetermined thickness and width, which step is realized by an extrusion apparatus having a rotatable screw and a fixed cylindrical barrel having a generally cylindrical conduit within which the screw is rotatably disposed intermediate a feed inlet that permits introduction of an elastomer mixture into the barrel and a discharge outlet provided with an extrusion nozzle that discharges the elastomer mixture to a nip formed between a first roller and a second roller that are made to rotate in opposite directions while maintaining a predetermined distance between respective adjacent circumferential extents of the first and second rollers. The method also includes a step of applying a cover layer upon a surface of the elastomeric layer that faces externally of the circumferential extent of the second roller, which step is realized by a positioning apparatus having a storage spool that stores a cover layer material as a roll and an application roller that enables assembly of the cover layer with the elastomeric layer. The method further includes a step of transporting an assembly of the elastomeric layer and the cover layer as a semi-finished product toward a downstream tire production installation, which step is realized by the second roller and a third roller in rotatable cooperation therewith, with the second roller and the third roller maintaining a predetermined distance between respective adjacent circumferential extents, and the third roller rotating in the same direction as the first roller.

In some embodiments, the step of producing the elastomeric layer includes the steps of feeding the elastomer mixture into the barrel at the feed inlet; feeding the elastomer mixture to the extrusion nozzle; discharging the elastomer mixture to the nip formed between the first roller and the second roller, with first and second rollers rotating in opposite directions at the time of discharge; and feeding the elastomer mixture toward the predetermined distance between the respective circumferential extents of the first and second rollers.

In some embodiments, the method also includes a step of detecting the thickness of the elastomeric layer and determining a detected value of the thickness relative to a reference thickness of the elastomeric layer. In some such embodiments, the step of detecting the thickness of the elastomeric layer and determining a detected value of the thickness relative to a reference thickness of the elastomeric layer is realized by at least one sensor disposed intermediate the nip and the application roller. In some such embodiments, the method also includes the step of adjusting a flow rate of the elastomer mixture to the nip as a function of the detected thickness of the elastomeric layer.

In some embodiments, the method also includes the step of linearly actuating the application roller toward the second roller so as to establish a tangential line of contact between the cover layer and the elastomeric layer as the second roller rotates.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Figure 1:
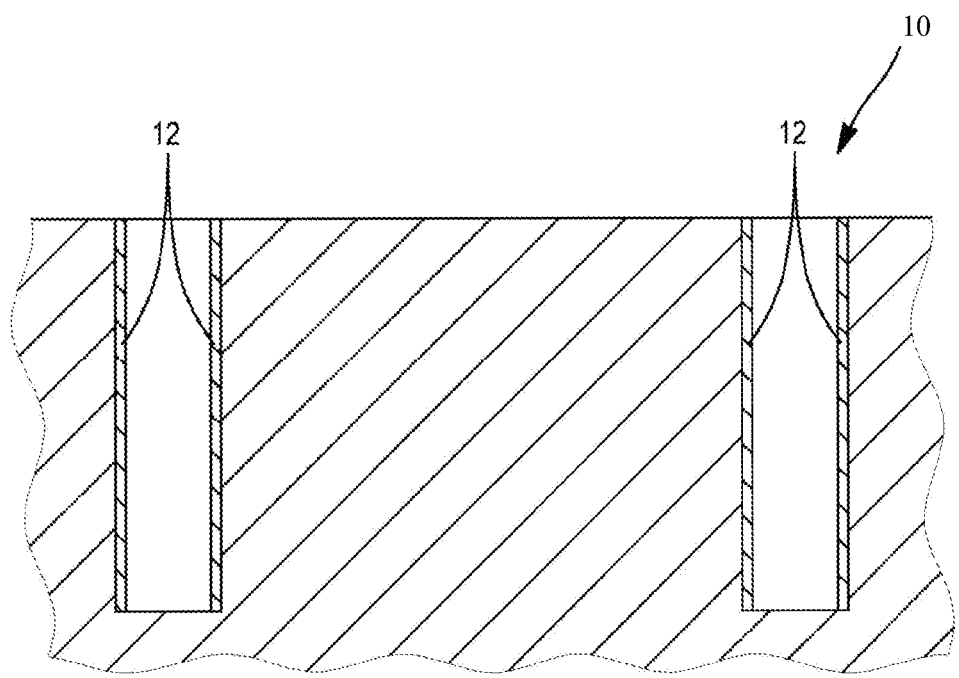
FIG. 1 shows a partial sectional view of an exemplary tread having a layered semi-finished product produced by the present invention.
Figure 2:
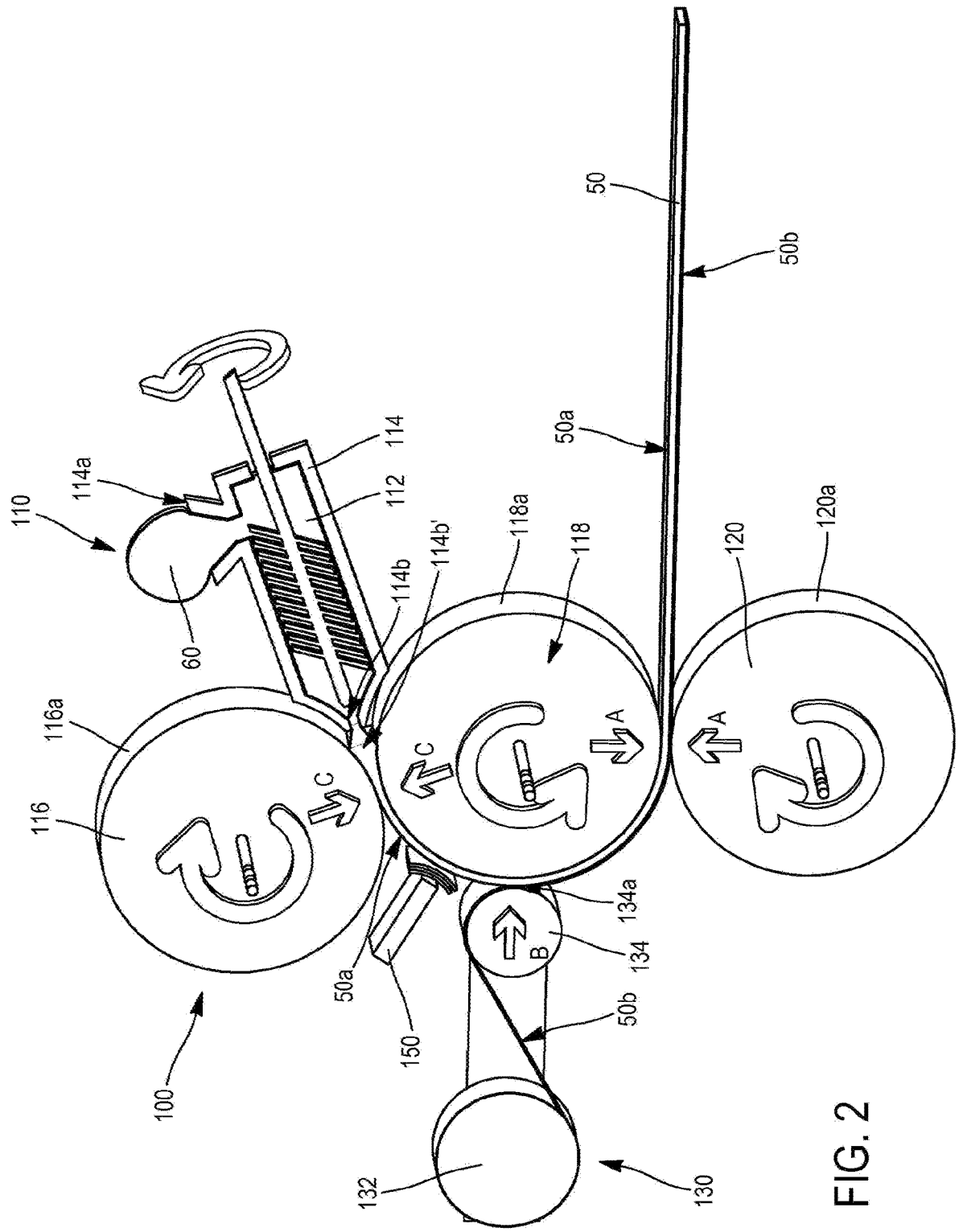
FIG. 2 shows a front perspective schematic view of a production installation of the present invention for producing a layered semi-finished product.

Now referring further to FIG. 2, a tire production system may be provided that includes a production installation 100 that realizes production of a semi-finished product 50. The semi-finished product 50 includes at least one unvulcanized elastomeric layer 50a and a cover layer 50b assembled therewith. The semi-finished product 50 is created as a generally elongate element (that is, an elongate rubber element of predetermined width and thickness that is destined for use in tires and tire products such as inner liners, sidewalls, carcasses, treads, etc.). It is not intended to detach the cover layer 50b from the elastomeric layer 50a during a sequence of supplying the semi-finished product 50 during a tire production cycle. The semi-finished product has a maximum thickness from about 17 mm to about 20 mm, inclusive, and preferably has a thickness from about 10 mm to about 17 mm, inclusive. The cover layer has a thickness of about 0.05 mm.

The production installation 100 includes an exemplary extrusion apparatus 110 that realizes a step of producing the elastomeric layer 50a as a continuous strip of profiled product. The extrusion apparatus 110 includes a rotatable screw 112 and a fixed cylindrical barrel 114 having a generally cylindrical conduit within which the screw 112 is rotatably disposed intermediate a feed inlet 114a and a discharge outlet 114b of the barrel. An electric motor or equivalent device (not shown) drives the screw 112 in a predetermined direction of rotation within the barrel 114, as indicated by the arrow in FIG. 2. The feed inlet 114a permits introduction of an elastomer mixture 60 into the barrel 114 which mixture includes material selected from among natural rubber, various synthetic elastomers (e.g., SBR, BR, etc.) and various elastomer blends. The elastomer mixture 60 can include one or more reinforcing fillers and/or process additives as is known in the art.

The discharge outlet 114b is provided with an extrusion nozzle 114b' that discharges the elastomer mixture 60 into a nip present between a first roller 116 and a second roller 118 that are made to rotate in opposite directions, with the direction of rotation of each roller being indicated by the arrows of FIG. 2. The axis of rotation of the first roller 116 is offset from the axis of rotation of the second roller 118. In this configuration, the first and second rollers form a roll die system that profiles the elastomer mixture 60 into a strip of predetermined width and thickness upon its discharge through the extrusion nozzle 114b' (an example of a process for forming such a strip is disclosed by the patent document FR3001654). The first roller 116 and the second roller 118 maintain a predetermined distance between respective adjacent circumferential extents 116a, 118a thereof.

The production installation 100 also includes a third roller 120 that cooperates with the second roller 118 to realize a step of transporting the semi-finished product 50 toward a downstream tire production installation (for example, a commercially available tension-controlled automatic winding station). The axes of rotation of the second roller 118 and the third roller 120 are in longitudinal alignment. The second roller 118 and the third roller 120 maintain a predetermined distance between respective adjacent circumferential extents 118a, 120a thereof such that the second and third rollers apply even pressure along the semi-finished product 50 during the transporting step (see arrows A of FIG. 2) while preserving the generally constant thickness of the elastomeric layer 50a.

Each roller may be driven by a corresponding programmable drive motor (not shown) that governs a rotational speed for each roller. Alternatively, a common drive system (for example, a gear or belt or equivalent system) (not shown) may govern rotation of all three rollers. A drive motor may operate the second roller 118 while the first roller 116 and the third roller 120 are rotated by frictional engagement with the second roller (and, more particularly, engagement between the respective circumferential extent of each roller and the elastomeric layer supported thereby). To facilitate a difference between the rotational speed of the first and third rollers 116, 120 (which rotate in the same direction at a commensurate rotational speed) and the second roller 118 (which rotates in a direction opposite that of the first and third rollers), the first and third rollers have diameters that are commensurate with one another but different from the larger diameter of the second roller. During production of the semi-finished product 50, a difference in surface speed ensures the generally constant thickness of the elastomeric layer 50a while facilitating alignment and adhesion of the cover layer 50b with the elastomeric layer. The direction of rotation of each roller is indicated by the arrows in FIG. 2.

The production installation 100 also includes a positioning apparatus 130 that realizes a step of applying the cover layer 50b upon a surface of the elastomeric layer 50a that faces externally of the circumferential extent 118a of the second roller 118 upon discharge from the extrusion nozzle 114b'. The cover layer 50b is sized to complement the predetermined width and thickness of the elastomeric layer produced by the extrusion apparatus 110. The cover layer 50b is produced from a cover layer material that may include a collection of fibers selected from textile fibers of natural origin (for example, silk fibers, cotton fibers, bamboo fibers, cellulose, wood fibers and combinations and equivalents thereof). In a preferred embodiment, the cover layer material is a paper layer of the type VN1016 type vinyl having a metric weight at or about 16 g/m$^2$. It is understood that equivalent cover layer materials are contemplated that are amenable to the practice of the disclosed invention.

The positioning apparatus 100 includes a storage spool 132 that stores the cover layer material as a roll, and an application roller 134 that enables integration of the cover layer 50b with the elastomeric layer 50a upon the latter's discharge by the first and second rollers. The storage spool 132 is interchangeable with commensurate storage spools to facilitate the use of different cover layer materials with commensurate elastomer mixtures. The storage spool 132 may be in communication with at least one braking device (not shown) that maintains a consistent speed of rotation during unwinding of the cover layer 50b. So as to avoid deformation of the cover layer 50b, the rotational speed of the storage spool 132 may be varied as a function of the supply of the cover layer to the elastomeric layer and the pull exerted on the cover layer by the application roller 134.

The application roller 134 is disposed at a predetermined distance from the storage spool 132 so as to maintain an angle at which the cover layer 50b realizes sufficient tension prior to its assembly with the elastomeric layer 50a. The application roller 134 is linearly actuatable relative to the circumferential extent 118a of the second roller 118, with the direction of actuation indicated by the arrow B of FIG. 2. This linear actuation, which may be effected by a piston cylinder unit or other known actuator (not shown), enables tangential contact between a circumferential extent 134a of the application roller 134 and the circumferential extent 118a of the second roller 118. During the step of applying the cover layer 50b, the application roller 134 maintains the cover layer 50b along a line of tangential contact with the surface of the elastomeric layer 50a not supported by the circumferential extent of the second roller. As the second roller 118 rotates, complementary rotation of the application roller 134 is effected so as to preserve uniform contact between the cover layer 50b and the unvulcanized elastomer mixture of the elastomeric layer 50a. Thus, pressure is evenly applied along the line of tangential contact so as to obviate undesirable indentations or "bites" in the surface of the elastomeric layer 50a during application of the cover layer 50b.

The production installation 100 may also include at least one sensor 150 that realizes a step of detecting a thickness of the elastomeric layer 50a and determining a detected value of the thickness relative to a reference thickness of the thickness (for example, in determining conformity to one or more specifications for the semi-finished product 50). The sensor 150 is disposed intermediate the extrusion apparatus 110 and the positioning apparatus 130. More particularly, the sensor is disposed intermittent the nip and the application roller 134 so as to detect the thickness of the unvulcanized elastomeric layer and indicate if an adjustment is required to ensure a generally constant strip thickness prior to the step of applying the cover layer 50b. For example, if the thickness detected by the sensor 150 reveals a deviation from the reference value, the flow rate of the elastomer mixture 60 to the nip can be adjusted as a function of the detected thickness of the elastomeric layer 50a (for example, by synchronizing the rotational speed of the rollers and/or the rotational speed of the screw 112).

During a process of producing the semi-finished product 50, the elastomer mixture 60 is fed into the barrel 114 at the feed inlet 114a. The screw 112 rotates at a predetermined rotational speed so as to feed the elastomer mixture 60 to the extrusion nozzle 114b'. The extrusion nozzle discharges the elastomeric mixture at an elevated temperature to the nip disposed between the first roller 116 and the second roller 118, which rollers are rotating in opposite directions at the time of discharge. The nip feeds the unvulcanized elastomeric mixture toward the predetermined distance between the respective circumferential extents 116a, 118a of the first and second rollers. The mutual pressure that is applied between the rollers (see the arrows C of FIG. 2) forms the elastomer mixture 60 into the elastomeric layer 50a, which is extruded as a continuous strip having a predetermined thickness that is detected and indicated by the sensor 150.

The second roller 118 maintains continuous rotation as the circumferential extent 118a thereof supports the elastomeric layer 50a and directs the elastomeric layer toward the positioning apparatus 130. The application roller 134 may be in a ready position that requires linear actuation of the application roller toward the second roller 118 (as indicated by the arrow B of FIG. 2) in order to establish the tangential line of contact between the cover layer 50b and the elastomeric layer 50a. The rotation of the second roller 118 drives the rotation of the application roller 134 such that the assembly of the cover layer 50b and the elastomeric layer 50a is realized without creasing either layer. As the second roller 118 continues to direct the elastomeric layer 50a toward the application roller 134, the preservation of this tangential line of contact also prevents the entry of air between the layers, thereby ensuring the setting accuracy of the unvulcanized elastomeric mixture. The assurance of proper alignment of the cover layer 50b relative to the elastomeric layer 50a, in combination with the preservation of the elastomeric layer's predefined thickness, ensures accurate lateral positioning of the semi-finished product 50 (for example, on a winding reel) in later production operations.

Once the cover layer 50b and the elastomeric layer 50a are assembled as the semi-finished product 50, the second roller 118 directs the resultant semi-finished product toward the third roller 120 and, more particularly, toward the predetermined distance maintained between the respective circumferential extents 118a, 120a between the second and third rollers. The pressure that is evenly applied along a tangential line of contact between the second roller 118 and this third roller 120 (see arrows A of FIG. 2) facilitates supplementary adhesion between the cover layer 50b and the elastomeric layer 50a. The layers thus become integrated into a single product while preserving the thickness requirement of the elastomeric layer 50a. The disclosed invention realizes in-situ extrusion of an elastomeric layer and ready assembly of this extruded layer in a manner that obviates variation in the properties of the extruded material.

The production installation 100 may be one of several installations that together form at least part of a tire production system, one or more of which may be controlled by one or more programmable controllers.

The terms "at least one" and "one or more" are used interchangeably. Ranges that are described as being "between a and b" are inclusive of the values for "a" and "b"

While particular embodiments of the disclosed devices have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A production installation comprising:
   an extrusion apparatus configured to produce the elastomeric layer as a continuous strip having a predetermined thickness and width, with the extrusion apparatus having a rotatable screw and a fixed cylindrical barrel having a generally cylindrical conduit within which the screw is rotatably disposed intermediate a feed inlet that permits introduction of an elastomer mixture into the barrel and a discharge outlet provided with an extrusion nozzle that discharges the elastomer material to a nip formed between a first roller and a second roller that are made to rotate in opposite directions while maintaining a predetermined distance between respective adjacent circumferential extents of the first and second rollers, wherein an axis of rotation of the first roller is offset from an axis of rotation of the second roller;
   a positioning apparatus configured to apply the cover layer upon a surface of the elastomeric layer that faces externally of the circumferential extent of the second roller, the positioning apparatus including a storage spool that stores a cover layer material as a roll and an application roller that enables assembly of the cover layer with the elastomeric layer; and
   a third roller that rotatably cooperates with the second roller to transport the semi-finished product toward a downstream tire production installation, with the second roller and the third roller maintaining a predetermined distance between respective adjacent circumferential extents, and the third roller rotating in the same direction as the first roller, wherein the axis of rotation of the second roller and an axis of rotation of the third roller are in longitudinal alignment, and the first and third rollers have diameters that are commensurate with one another but different from a larger diameter of the second roller,
   wherein the application roller is linearly actuatable relative to the circumferential extent of the second roller, and along the line connecting the axes of the second roller and application roller, so as to maintain the cover layer along a line of tangential contact with a surface of the elastomeric layer not supported by the circumferential extent of the second roller as the second roller rotates, and
   wherein the production installation is configured to produce a semi-finished product for use in tire production and having at least one unvulcanized elastomeric layer and a cover layer assembled therewith.

2. The production installation of claim 1, wherein the application roller is disposed at a predetermined distance from the storage spool so as to maintain an angle at which the cover layer realizes sufficient tension prior to assembly with the elastomeric layer.

3. The production installation of claim 1, further comprising at least one sensor configured to detect the thickness of the elastomeric layer and determine a detected value of the thickness relative to a reference thickness of the elastomeric layer.

4. The production installation of claim 3, wherein the sensor is disposed intermediate the nip and the application roller.

5. The production installation of claim 1, wherein the storage spool is in communication with at least one braking device that maintains a consistent rotational speed during unwinding of the cover layer.

6. A method for producing a semi-finished product for use in tire production, the method comprising the following steps
   producing an elastomeric layer as a continuous strip having a predetermined thickness and width, which step is realized by an extrusion apparatus having a rotatable screw and a fixed cylindrical barrel having a generally cylindrical conduit within which the screw is rotatably disposed intermediate a feed inlet that permits introduction of an elastomer mixture into the barrel and a discharge outlet provided with an extrusion nozzle that discharges the elastomer mixture to a nip formed between a first roller and a second roller that are made to rotate in opposite directions while maintaining a predetermined distance between respective adjacent circumferential extents of the first and second rollers, wherein an axis of rotation of the first roller is offset from an axis of rotation of the second roller;
   applying a cover layer upon a surface of the elastomeric layer that faces externally of the circumferential extent of the second roller, which step is realized by a positioning apparatus having a storage spool that stores a cover layer material as a roll and an application roller that enables assembly of the cover layer with the elastomeric layer;
   linearly actuating the application roller toward the second roller along the line connecting the axes of rotation of the application roller and the second roller, so as to establish a tangential line of contact between the cover layer and the elastomeric layer as the second roller rotates; and
   transporting an assembly of the elastomeric layer and the cover layer as a semi-finished product toward a downstream tire production installation, which step is realized by the second roller, and a third roller in rotatable cooperation therewith, with the axis of rotation of the second roller and an axis of rotation of the third roller in longitudinal alignment, with the first and third rollers having diameters that are commensurate with one another but different from a larger diameter of the second roller, with the second roller and the third roller maintaining a predetermined distance between respective adjacent circumferential extents, and the third roller rotating in the same direction as the first roller.

7. The method of claim 6, wherein the step of producing the elastomeric layer includes the steps of:
   feeding the elastomer mixture into the barrel at the feed inlet;
   feeding the elastomer mixture to the extrusion nozzle;
   discharging the elastomer mixture to the nip formed between the first roller and the second roller, with first and second rollers rotating in opposite directions at the time of discharge; and
   feeding the elastomer mixture toward the predetermined distance between the respective circumferential extents of the first and second rollers.

8. The method of claim 6, further comprising a step of detecting a thickness of the elastomeric layer and determining a detected value of the thickness relative to a reference thickness of the elastomeric layer.

9. The method of claim 8, wherein the step of detecting the thickness of the elastomeric layer and determining a detected value of the thickness relative to a reference thickness of the elastomeric layer is realized by at least one sensor disposed intermediate the nip and the application roller.

10. The method of claim 8, further comprising a step of adjusting a flow rate of the elastomer mixture to the nip as a function of the detected thickness of the elastomeric layer.

* * * * *